(12) United States Patent
Chang

(10) Patent No.: US 6,663,288 B1
(45) Date of Patent: Dec. 16, 2003

(54) BEARING STRUCTURE

(76) Inventor: Chin-pao Chang, No. 522, Sec. 1, Wan Shou Road, Kuei Shan Hsiang, Taoyuan Hsien (TW)

(*) Notice: Subject to any disclaimer, the term of this patent is extended or adjusted under 35 U.S.C. 154(b) by 0 days.

(21) Appl. No.: 10/237,792

(22) Filed: Sep. 10, 2002

(51) Int. Cl.⁷ .............................................. F16C 17/02
(52) U.S. Cl. ...................... 384/125; 384/220; 384/255; 384/260; 384/263
(58) Field of Search ................. 384/125, 255, 384/220, 260, 263

(56) References Cited

U.S. PATENT DOCUMENTS

| | | | | |
|---|---|---|---|---|
| 4,027,933 A | * | 6/1977 | Taylor | 384/255 |
| 4,195,568 A | * | 4/1980 | Fischer | 384/255 |
| 5,809,610 A | * | 9/1998 | Eustache | 384/192 |

* cited by examiner

*Primary Examiner*—Lenard A. Footland
(74) *Attorney, Agent, or Firm*—Bacon & Thomas, PLLC

(57) ABSTRACT

A bearing structure includes a pivot shaft and an elastomer for connecting to a pivot device formed from a first and a second connection member. The pivot shaft includes a connecting portion pivotally connected to the first connection member, an eccentric middle portion, and a bearing portion fixedly connected to the second connection member. The elastomer is mounted on the first connection member to contact with the eccentric middle portion of the pivot shaft, such that a tightness of contact between the elastomer and the eccentric middle portion is adjustable via an adjusting screw to locate the first and second connection members in place after they have been turned relative to each other. An elastic element is held between the pivot shaft and the first connection member to adjust a torsional force of the pivot device when the second connection member is turned relative to the first connection member.

11 Claims, 5 Drawing Sheets

BEARING STRUCTURE

FIELD OF THE INVENTION

The present invention relates to a bearing structure including a pivot shaft and an elastomer for connecting to a pivot device formed from a first and a second connection member. The pivot shaft includes a connecting portion pivotally connected to the first connection member, a bearing portion fixedly connected to the second connection member, and an eccentric middle portion located between the connecting and the bearing portion. The elastomer is mounted on the first connection member to contact with the eccentric middle portion of the pivot shaft. The first connection member is provided with adjusting means for adjusting a tightness of contact between the elastomer and the eccentric middle portion of the pivot shaft, so that the first and the second connection member are located in place after they have been turned relative to each other.

BACKGROUND OF THE INVENTION

FIG. 1 shows a conventional pivot device 1, and FIG. 2 shows the use of the pivot device 1. As shown, the pivot device 1 mainly includes a first shaft 11 having a bearing portion 111 for fixedly connecting to an article 2 to be pivotally turned, and a hollow receiving portion 112; and a second shaft 12 having a connecting portion 121 for fixedly connecting to a base 3 relative to which the article 2 is pivotally turned, and an inserting portion 122 for rotatably inserting into the hollow receiving portion 112 of the first shaft 11.

The bearing portion 111 of the first shaft 11 and the connecting portion 121 of the second shaft 12 are provided with through holes 113, 123, respectively, for insertion pins 4 to extend therethrough into cavities 21, 31 correspondingly provided on the article 2 and the base 3, respectively.

To assemble the pivot device 1 to the article 2 and the base 3, first extend the insertion pins 4 through the through holes 123 on the connecting portion 121 of the second shaft 12 into the cavities 31 on the base 3, so that the second shaft 12 is fixedly connected to the base 3. Then, put the receiving portion 112 of the first shaft 11 around the inserting portion 122 of the second shaft 12 and extend insertion pins 4 through the through holes 113 on the bearing portion 111 of the first shaft 11 into the cavities 21 on the article 2, so that the first shaft 11 is fixedly connected to the article 2. By pivotally turning the receiving portion 112 of the first shaft 11 relative to the inserting portion 122 of the second shaft 12, the article 2 and the base 3 are rotatable relative to each other.

In the above-described conventional pivot device 1, there is not any means for controlling a rotational speed of the article 2 and the base 3 when they are turned relative to each other. That is, when the article 2 is rotated relative to the base 3, a torsional force thereof is controlled completely by an external force. Moreover, since the conventional pivot device 1 does not include any locating means, the article 2 must rely on external means to locate in place relative to the base 3 after it has been turned.

It is therefore tried by the inventor to develop a bearing structure for connecting to a pivot device to eliminate the drawbacks existed in the conventional pivot device.

SUMMARY OF THE INVENTION

A primary object of the present invention is to provide a bearing structure for connecting to two connection members of a pivot device, so that the two connection members can be rotated relative to each other and be located in place.

Another object of the present invention is to provide a bearing structure for connecting to two connection members of a pivot device, so that a torsional force of the pivot device for rotating the two connection members relative to each other can be adjusted.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
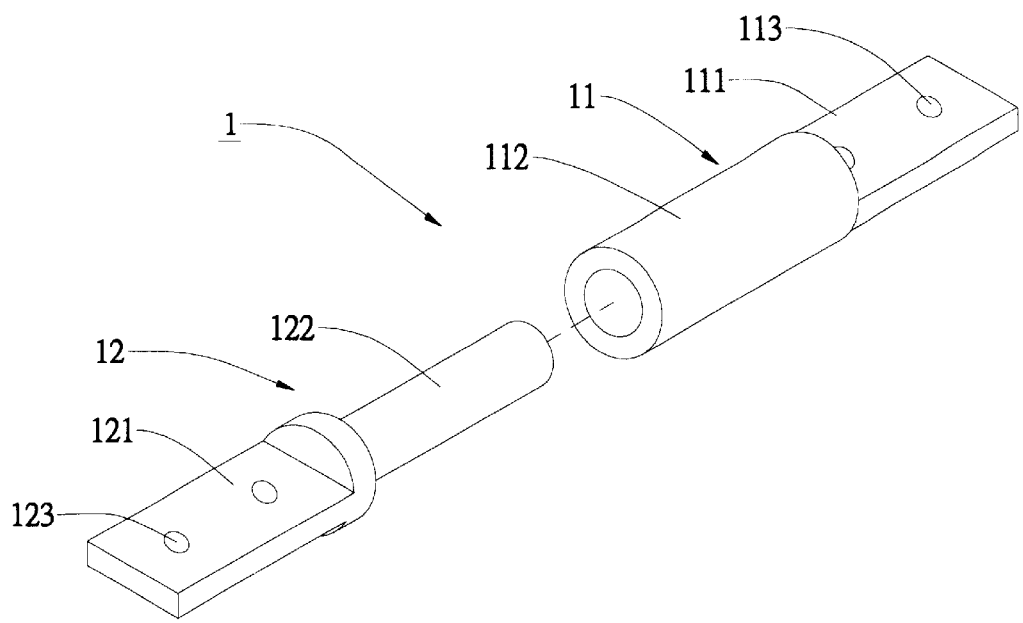
FIG. 1 is an exploded perspective view of a conventional pivot device.
Figure 2:
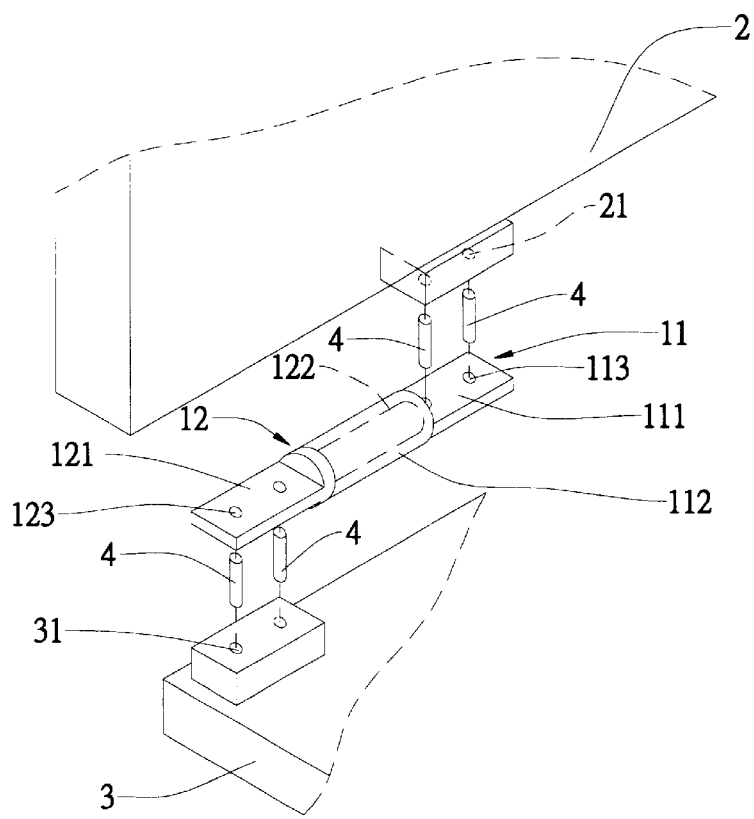
FIG. 2 is an exploded perspective view showing connection of the conventional pivot device of FIG. 1 to a base and an article to be pivotally turned.
Figure 3:
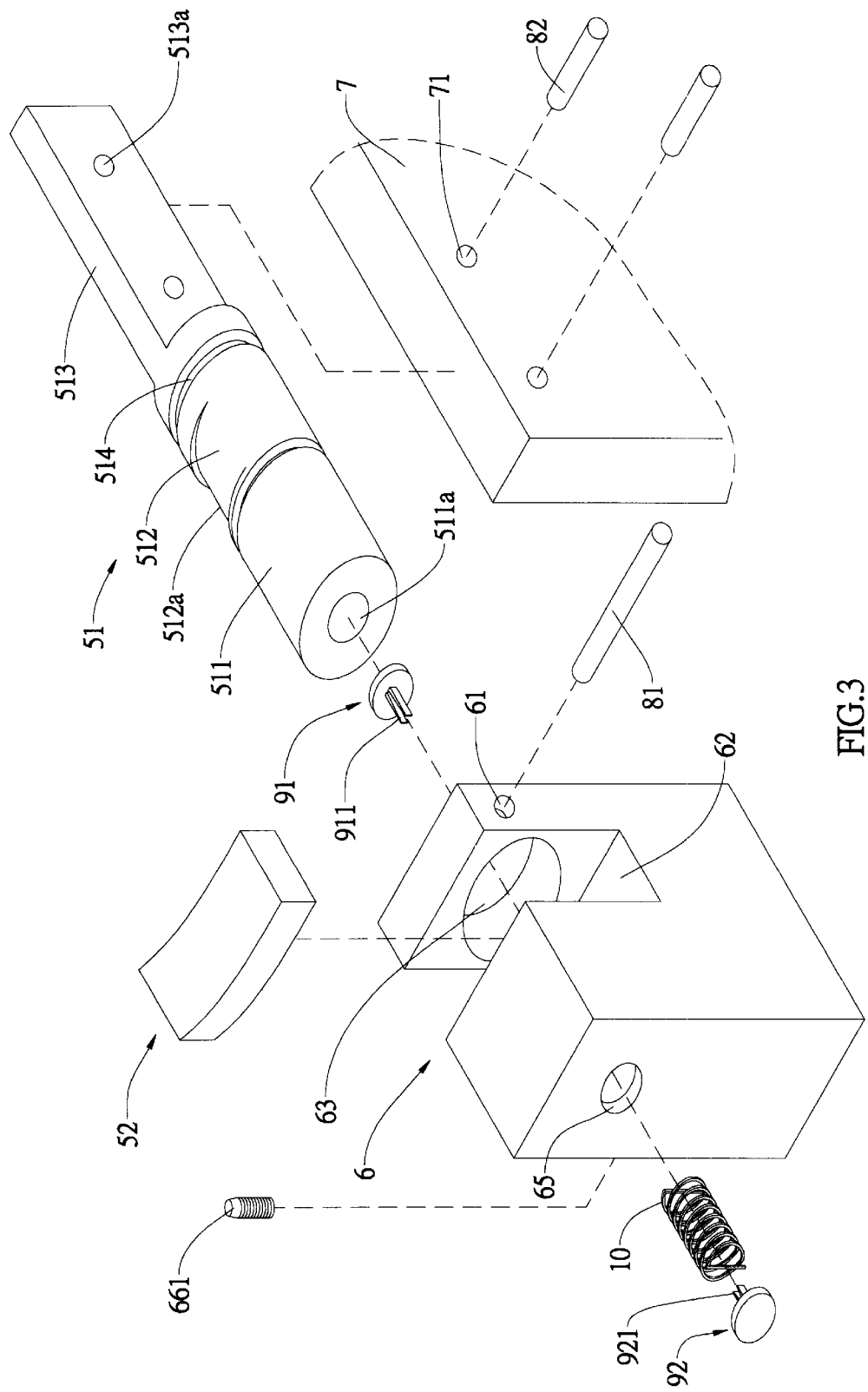
FIG. 3 is an exploded perspective view of a bearing structure according to the present invention for connecting to a pivot device.
Figure 4:
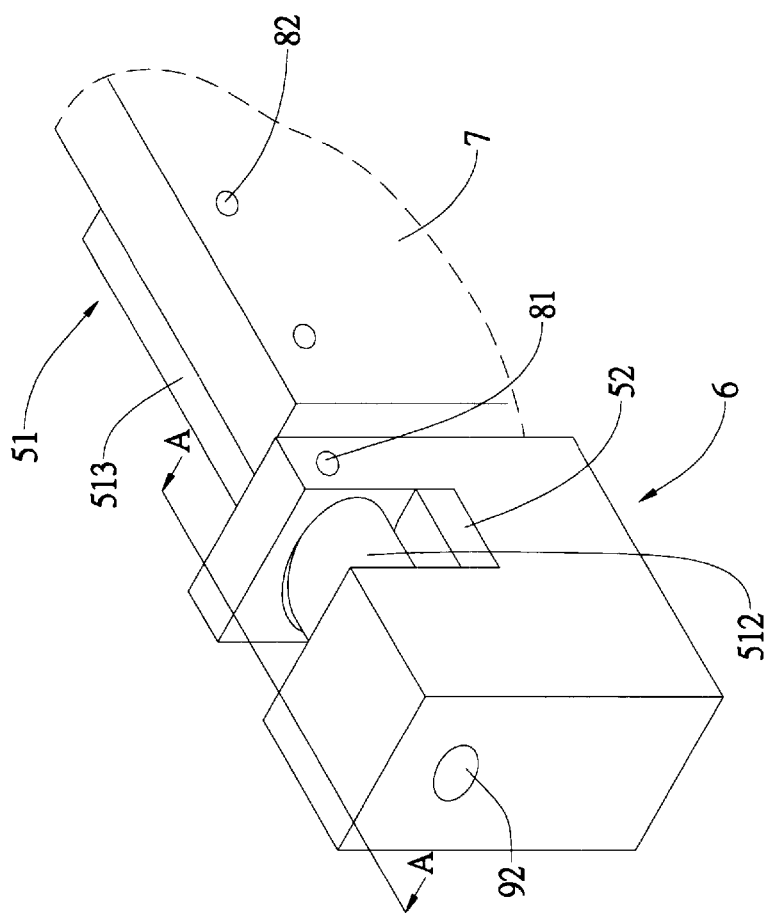
FIG. 4 is an assembled perspective view of FIG. 3.

Please refer to FIGS. 3 and 4 that are exploded and assembled perspective views, respectively, of a bearing structure according to the present invention for connecting to a first and a second connection member 6, 7 that together form a pivot device. As shown, the bearing structure mainly includes a pivot shaft 51 and an elastomer 52.

The pivot shaft 51 includes a connecting portion 511 for rotatably connecting to the first connection member 6, an eccentric middle portion 512 having a lowered area 512a, and a bearing portion 513 opposite to the connecting portion 511 for fixedly connecting to the second connection member 7. An annular groove 514 is formed around the pivot shaft 51 between the eccentric middle portion 512 and the bearing portion 513. The elastomer 52 is mounted in a recess 62 formed on the first connection member 6.

Figure 5:
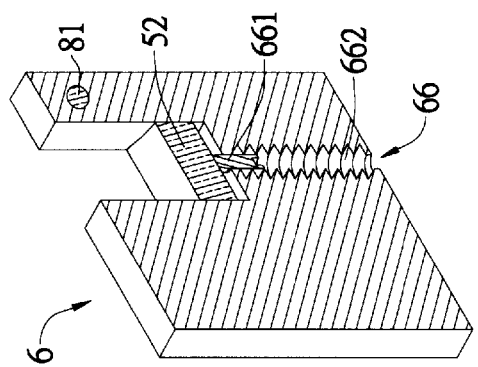
FIG. 5 is a sectional view taken along line A—A of FIG. 4.

The first connection member 6 is provided with adjusting means 66 consisting of an adjusting screw 661 and a threaded hole 662 formed below the recess 62 of the first connection member 6 (see FIG. 5). When the pivot shaft 51 is extended through the first connection member 6 in a manner that will be described in more details later, the eccentric middle portion 512 of the pivot shaft 51 is located in the recess 62 to contact with the elastomer 52. By screwing the adjusting screw 661 from a bottom of the threaded hole 662 to press a front end of the adjusting screw 661 against the elastomer 52 in the recess 62, a tightness of contact between the elastomer 52 and the pivot shaft 51 and accordingly, an interaction of the elastomer 52 and the pivot shaft 51 with each other can be adjusted to locate the first and the second connection member 6, 7 in place.

The first connection member 6 is further provided at a predetermined position with a through hole 61, via which a locating pin 81 can be inserted into the annular groove 514 on the pivot shaft 51 when the latter is connected at the connecting portion 511 to the first connection member 6. The locating pin 81 inserted through the hole 61 into the groove 514 prevents the pivot shaft 51 from axially moving out of the first connection member 6.

The connecting portion 511 of the pivot shaft 51 and the first connection member 6 are provided at predetermined positions with a first receiving hole 511a and a second receiving hole 65, respectively, for receiving therein a first and a second clip 91, 92, respectively. The first and the second clip 91, 92 are flat plates with two legs 911, 921 projected from one side thereof. An elastic element 10 is disposed between the first and the second clip 91, 92 with two ends of the elastic element 10 firmly held to the legs 911, 921 for adjusting a torsional force of the pivot device for rotating the second connection member 7 relative to the first connection member 6.

The second connection member 7 is provided at predetermined positions with through holes 71 corresponding to cavities 513a provided on the bearing portion 513 of the pivot shaft 51, so that insertion pins 82 can be inserted through the holes 71 into the cavities 513a to connect the second connection member 7 to the bearing portion 513 of the pivot shaft 51.

Figure 7:
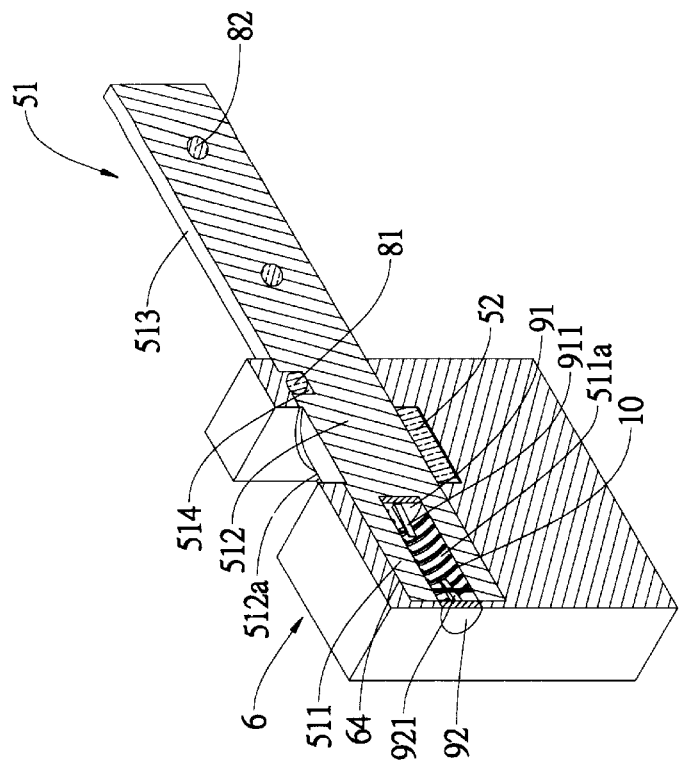
FIG. 7 is a sectional view taken along line B—B of FIG. 6.
Figure 6:
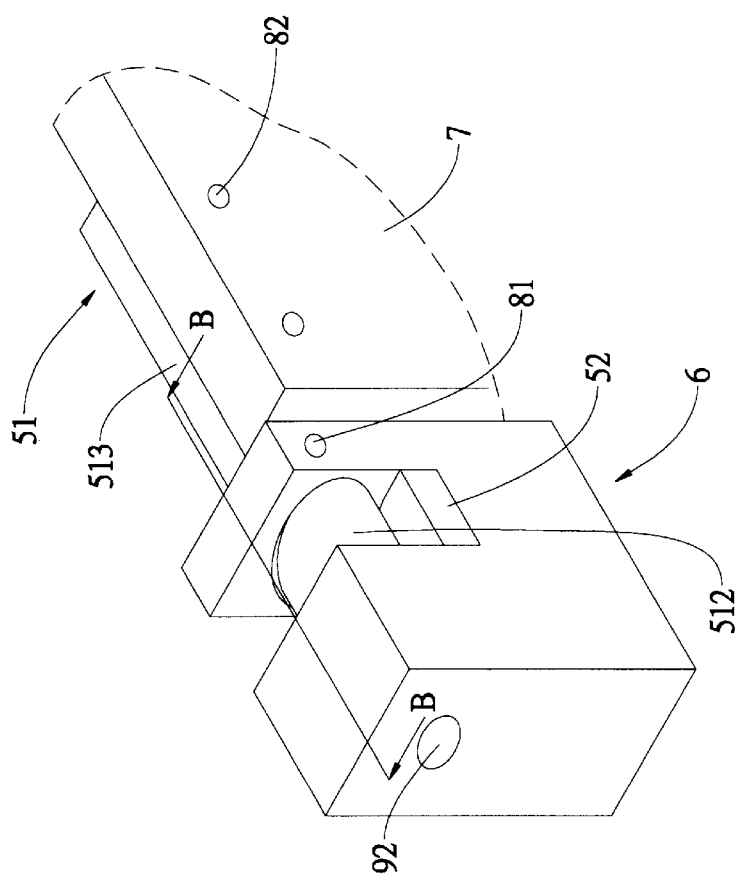
FIG. 6 is an assembled perspective view of FIG. 3.

Please refer to FIGS. 6 and 7. To assemble the bearing structure of the present invention to the pivot device formed from the first and the second connection member 6 and 7, first fixedly mount the elastomer 52 in the recess 62 on the first connection member 6. Then, mount the first clip 91 in the first receiving hole 511a of the connecting portion 511 of the pivot shaft 51, and connect an end of the elastic element 10 to the two legs 911 of the first clip 91. Extend the connecting portion 511 of the pivot shaft 51 through a first pivot hole 63 into a second pivot hole 64 both being formed on the first connection member 6 (see FIG. 7). Connect another end of the elastic element 10 to the two legs 921 of the second clip 92, and mount the second clip 92 in the second receiving hole 65 on the first connection member 6. Insert the locating pin 81 into the through hole 61 on the first connection member to locate a front end of the locating pin 81 in the annular groove 514 on the pivot shaft 51. Insert the insertion pins 82 through the through holes 71 on the second connection member 7 to engage with the cavities 513a on the bearing portion 513 of the pivot shaft 51, so as to connect the second connection member 7 to the pivot shaft 51. Finally, screw the adjusting screw 661 into the threaded hole 662 from the bottom of the first connection member 6 to press the front end of the adjusting screw 661 against the elastomer 52 mounted in the recess 62.

To operate the bearing structure of the present invention, first turn the adjusting screw 661 in the threaded hole 662 of the first connection member 6 to press the front end of the adjusting screw 661 against the elastomer 52, so that the elastomer 52 is in contact with the eccentric middle portion 512 of the pivot shaft 51 at a certain tightness. By way of tightening or loosening the adjusting screw 661 into or from the threaded hole 662, the tightness of contact between the eccentric middle portion 512 of the pivot shaft 51 and the elastomer 52 can be adjusted.

Figure 9:
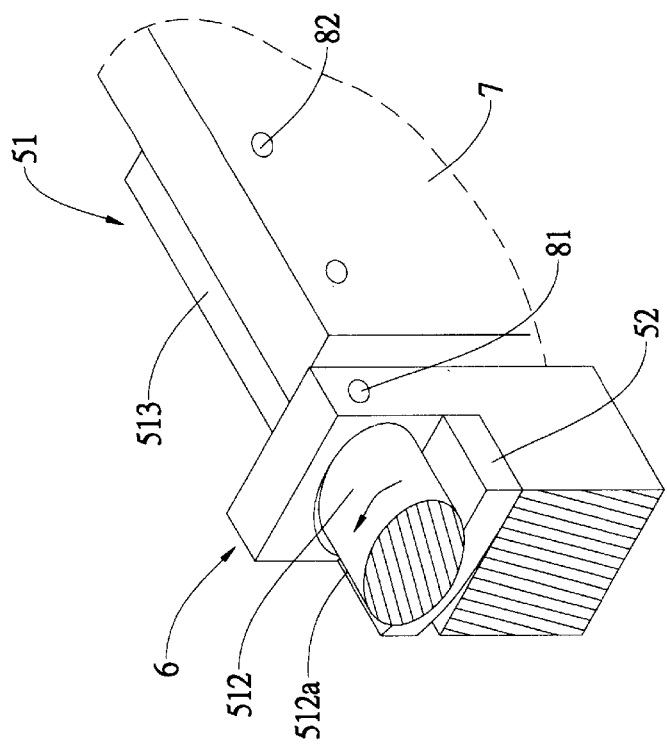
FIG. 9 is a sectional view taken along line C—C of FIG. 8.
Figure 8:
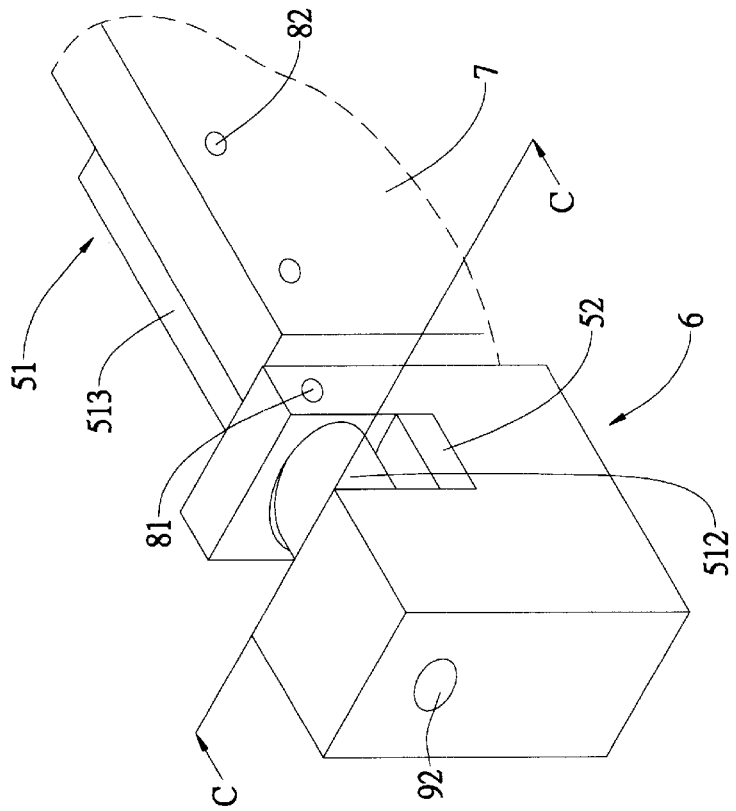
FIG. 8 is an assembled perspective view of FIG. 3.

Please now refer to FIGS. 8 and 9. When the second connection member 7 is turned to cause turning of the pivot shaft 51 that is fixedly connected at the bearing portion 513 to the second connection member 7 and the lowered area 512a of the eccentric middle portion 512 of the pivot shaft 51 is finally moved during the turning to a position no longer in contact with the elastomer 52, areas on the eccentric middle portion 512 other than the lowered area 512a gradually press against the elastomer 52. The elasticity of the elastomer 52 allows these raised areas of the eccentric middle portion 512 to tightly press against the elastomer 52 until the second connection member 7 is no longer turned. Meanwhile, since the elastic element 10 is held between the first and the second clip 91, 92, and the first clip 91 is mounted on the pivot shaft 51 that turns along with the second connection member 7, the elastic element 10 is turned while the second connection member 7 is turned and therefore generates a torsional force that has the effect of reducing a rotational speed of the second connection member 7.

Moreover, by changing the length, the elasticity, or the diameter of the elastic element 10, it is possible to regular the torsional force of the pivot device when the second connection member 7 is turned.

With the above arrangements, the bearing structure of the present invention has at least the following features and advantages:

1. The adjusting means 66 provided on the first connection member 6 enable adjustment of the tightness of contact between the eccentric middle portion 512 of the pivot shaft 51 and the elastomer 52, so that the first and the second connection member 6, 7 can be located in place after they are turned relative to each other.
2. The provision of mutually contactable eccentric middle portion 512 of the pivot shaft 51 and elastomer 52 enables the first and the second connection member 6, 7 to be turned relative to each other to a fixed position.
3. The elastic element 10 disposed between the pivot shaft 51 and the first connection member 6 is capable of adjusting the torsional force of the pivot device when the second connection member 7 is rotated relative to the first connection member 6.

The present invention has been described with a preferred embodiment thereof and it is understood that many changes and modifications in the described embodiment can be carried out without departing from the scope and the spirit of the invention as defined by the appended claims.

What is claimed is:

1. A bearing structure for connecting to a pivot device formed from a first and a second connection member, comprising:

a pivot shaft being pivotally connected at an end to said first connection member, and fixedly connected at another end to said second connection member, and being provided with an eccentric middle portion; and an elastomer being mounted on said first connection member, such that a tightness of contact between said eccentric middle portion of said pivot shaft and said elastomer is adjustable through adjusting means provided on said first connection member for said first and said second connection member to locate in place after they have been turned relative to each other.

2. The bearing structure as claimed in claim 1, wherein said adjusting means include an adjusting screw and a threaded hole formed on said first connection member; said adjusting screw being screwed into said threaded hole to press a front end against said elastomer mounted on said first connection member above said threaded hole and thereby adjusting the tightness of contact between said eccentric middle portion of said pivot shaft and said elastomer for said first and said second connection member to locate in place after they have been turned relative to each other.

3. The bearing structure as claimed in claim 1, wherein said end of said pivot shaft pivotally connecting to said first connection member is a connecting portion.

4. The bearing structure as claimed in claim 1, wherein said first connection member is provided with first and second pivot holes through which said pivot shaft is extended to pivotally connect to said first connection member.

5. The bearing structure as claimed in claim 1, wherein said another end of said pivot shaft fixedly connecting to said second connection member is a bearing portion.

6. The bearing structure as claimed in claim 1, wherein said first connection member is provided with a recess in which said elastomer is mounted.

7. The bearing structure as claimed in claim 1, wherein said first connection member is provided with a through hole for a locating pin to extend thereinto, and wherein said pivot shaft is provided with an annular groove corresponding to said through hole on said first connection member, whereby when said locating pin is extended through said through hole on said first connection member into said annular groove on said pivot shaft, said pivot shaft is held to said first connection member to avoid axially moving out of said first connection member.

8. The bearing structure as claimed in claim 1, further comprising an elastic element disposed between said pivot shaft and said first connection member for regulating a torsional force of said pivot device when said second connection member is turned relative to said first connection member.

9. The bearing structure as claimed in claim 8, further comprising first and second clips for connecting to two ends of said elastic element.

10. The bearing structure as claimed in claim 9, wherein said pivot shaft is provided with a first receiving hole for receiving said first clip therein, and said first connection member being provided with a second receiving hole for receiving said second clip therein.

11. The bearing structure as claimed in claim 9, wherein said first and said second clip are flat plates each having two legs projected from one side thereof for connecting to two ends of said elastic element.

\* \* \* \* \*